United States Patent
Hoefelmeyer et al.

(10) Patent No.: US 7,043,757 B2
(45) Date of Patent: May 9, 2006

(54) SYSTEM AND METHOD FOR MALICIOUS CODE DETECTION

(75) Inventors: Ralph S. Hoefelmeyer, Colorado Springs, CO (US); Theresa E. Phillips, Fairfax, VA (US)

(73) Assignee: MCI, LLC, Basking Ridge, NJ (US)

( * ) Notice: Subject to any disclaimer, the term of this patent is extended or adjusted under 35 U.S.C. 154(b) by 711 days.

(21) Appl. No.: 09/862,851

(22) Filed: May 22, 2001

(65) Prior Publication Data

US 2005/0086499 A1    Apr. 21, 2005

(51) Int. Cl.
*H02H 3/05* (2006.01)

(52) U.S. Cl. .............. 726/24; 726/22; 726/23; 726/24; 713/188; 709/223; 709/224

(58) Field of Classification Search ........ 713/200–201, 713/188; 707/200; 714/38; 709/223–224, 709/23, 24; 726/22, 23, 24
See application file for complete search history.

(56) References Cited

U.S. PATENT DOCUMENTS

| | | | |
|---|---|---|---|
| 5,414,833 A | | 5/1995 | Herhey et al. |
| 5,440,723 A | * | 8/1995 | Arnold et al. ............... 714/2 |
| 5,623,600 A | * | 4/1997 | Ji et al. ................. 713/201 |
| 5,796,948 A | | 8/1998 | Cohen |
| 5,991,881 A | * | 11/1999 | Conklin et al. .......... 713/201 |
| 6,088,804 A | * | 7/2000 | Hill et al. ............... 713/201 |
| 6,094,731 A | * | 7/2000 | Waldin et al. ............. 714/38 |
| 6,253,337 B1 | | 6/2001 | Maloney et al. |
| 6,330,590 B1 | | 12/2001 | Cotton |
| 6,338,141 B1 | * | 1/2002 | Wells ..................... 713/200 |
| 6,385,747 B1 | * | 5/2002 | Scott et al. ............... 714/724 |
| 6,574,737 B1 | * | 6/2003 | Kingsford et al. ........ 713/201 |
| 6,578,147 B1 | * | 6/2003 | Shanklin et al. ......... 713/200 |
| 6,611,925 B1 | * | 8/2003 | Spear .................... 714/38 |
| 6,622,150 B1 | * | 9/2003 | Kouznetsov et al. ...... 707/200 |
| 2002/0032766 A1 | * | 3/2002 | Xu ....................... 709/223 |
| 2002/0069356 A1 | * | 6/2002 | Kim ..................... 713/160 |
| 2003/0191957 A1 | * | 10/2003 | Hypponen et al. ........ 713/200 |

OTHER PUBLICATIONS

GFI Software, "one Virus Engine Is Not Enough: The Case for Maximizing Network Protection with Multiple Anti-Virus Scanners", Jul. 15, 2002, downloaded from http://www.WindowsSecurity.com May 10, 2004.*

Bassham, L., "Threat Assessment of Malicious Code and Human Computer Threats", National Institute of Standards and Technology, Computer Security Division, Oct. 1992.

* cited by examiner

*Primary Examiner*—Christopher Revak
*Assistant Examiner*—Taghi T. Arani (57) ABSTRACT

A system for malicious code detection includes a front-end processor, multiple scanning computer systems, and a detection management system. During operation, the multiple scanning computer systems scan content for malicious code and generate an alarm when the content contains malicious code. The front-end processor receives a flow of content from an external network and distributes copies of the flow to each of the multiple scanning computer systems in parallel for scanning. The detection management system employs a countermeasure on the flow if at least one of the scanning computer systems generates the alarm.

32 Claims, 3 Drawing Sheets

SYSTEM AND METHOD FOR MALICIOUS CODE DETECTION

FIELD OF THE INVENTION

The present invention relates to computer security and more particularly to a system and method for malicious code detection.

BACKGROUND OF THE INVENTION

Malicious code is software that is designed to damage a computer system or its data or to prevent the computer system from being used in its normal manner. Also termed "malware," malicious code includes viruses, Trojan horses, worms, and malicious active content. A virus is a particularly pernicious kind of malicious code, capable of attaching itself to disks or other files and replicating itself repeatedly, typically without user knowledge or permission. Some viruses display symptoms, and some viruses damage files and computer systems, but neither symptoms nor damage is essential in the definition of a virus. A non-damaging virus is still a virus, yet even non-damaging viruses are considered malicious if they consume valuable computer resources without permission.

Some viruses propagate by attaching themselves to files so that executing an infected file also causes the virus to execute. The virus then hooks into the operating system to infect other computer files as they are opened, modified or created. Before the popularity of the Internet, viruses were most commonly spread by sharing floppy disks that have been infected or that contain infected files. The recent, explosive growth of the Internet has increased the opportunities for spreading malicious code quickly throughout the world, for example, through infected files attached to electronic mail messages. When the email recipient executes an infected email attachment, the virus is propagated to yet another computer system.

To combat viruses and other kinds of malicious code, vendors have begun to offer anti-virus software that scans incoming files and other content for embedded viruses, Trojan horses, malicious document macros, and worms. The incoming content that is scanned typically includes attachments to an email message, the body of the email message itself, and scripts downloaded via HTTP. Such anti-virus software typically employs a proprietary catalog of viral signatures, which are often simple string of bytes that are expected to be found in every instance of particular viruses. Usually, different viruses have different signatures, and anti-virus scanners use signatures to locate specific viruses.

There are a large variety of viruses and other kinds of malicious code thriving on the Internet, but no single anti-virus scanner has 100% coverage of the known viruses. Each anti-virus scanner has its own set of viruses that the anti-virus scanner can detect, and many anti-virus scanners can detect viruses that are unknown to other anti-virus scanners on the market. Therefore, incomplete coverage of known viruses is a problem with individual anti-virus scanners.

Accordingly, attempts have been made to improve virus coverage by employing a variety of different anti-virus scanners. One example is the VIRUS CONTROL CENTRE™, which is currently offered from MessageLabs™ and is described at the http://www.messagelabs.com web site. The VIRUS CONTROL CENTRE™ product comprises a cluster of control towers that are populated with a plurality of scanning mail servers, a switch, and a load distributor. All incoming email is redirected to a control tower for initial processing and scanning. After being delivered to a control tower, the email is directed to a particular scanning mail server, which executes three different types of commercial anti-virus scanners on the email. If the email is "clean," then the email is permitted to continue to its ultimate destination. Otherwise, the email is quarantined for 30 days and then destroyed.

This approach, however, suffers from several disadvantages, particularly in terms of latency. Latency is the delay imposed by scanning for viruses. For example, if each anti-virus scanner on the scanning mail server takes 400 ms to process an average email, then the latency imposed by the three anti-virus scanners is 1.2 seconds.

Although a 1.2 second latency may appear to be small at first blush, it is unacceptably large for interactive traffic such as surfing the World Wide Web. Email is not the only vector for transmitting malicious code, viruses can also be downloaded in web pages sent by the hypertext transfer protocol (HTTP) or in files sent by the file transfer protocol (FTP). If a user had to wait 1.2 seconds every time to see a new web page, the user would quickly become frustrated and seek less secure ways of accessing the Internet. On the other hand, a latency of about 0.5 seconds is still acceptable to most users.

Therefore, there is a need for a malicious code detection system and methodology with the good anti-viral coverage of multiple anti-virus scanners but characterized by the low latency commensurate with that of a single anti-virus scanner.

SUMMARY OF THE INVENTION

These and other needs are addressed by the present invention, in which incoming content scanned in parallel by different anti-virus software on separate processors in a multi-processor or multi-computer configuration. By scanning incoming content in parallel on separate processors, the latency of scanning the content is reduced to that of only one of the anti-virus scanners plus a small amount of overhead. For example, if three anti-virus scanners operating in parallel have an average latency of 400 ms each, the overall latency due to the parallel operation is not 1.2 ms but 400 ms plus a 10% overhead for a 440 ms overhead, which is acceptable to users surfing the World Wide Web.

Accordingly, one aspect of the invention relates to a system and methodology for malicious code detection. The system includes a front-end processor, multiple scanning computer systems, and a detection management system. The multiple scanning computer systems are configured for scanning content for malicious code and generating an alarm when the content contains malicious code. The front-end processor, which is coupled to the scanning computer systems, receives a flow of content (including, for example, email message bodies, email attachments, HTTP or FTP files) from an external network, such as the Internet, and distributes copies of the flow to each of the scanning computer systems in parallel for scanning. The detection management system, also coupled to the scanning computer systems, employs a countermeasure on the flow if at least one of the scanning computer systems generates the alarm.

Another aspect of the invention relates to a malicious code detection system and methodology that includes a remote site detection system configured for detecting malicious code in incoming network traffic based on signatures of malicious code. In this system, multiple scanning computer systems configured to execute anti-virus scanning software having different coverage of malicious code for scanning content for malicious code and generating an alarm when the content contains malicious code. A front-end processor, coupled to the scanning computer systems, is configured for receiving a flow of content (including, e.g., email attachments, an email message body, a hypertext markup file or a transferred file) from an external network and distributing copies of the flow to each of the scanning computer systems in parallel for scanning. A detection management system, coupled to the scanning computer systems, is configured for creating a signature of a piece of malicious code detected by at least one of the scanning computer systems detected in the flow when at least one of the scanning computer generates an alarm on the piece of malicious code and causing the signatures stored at the remote site detection system to be updated to include the signature of the detected piece of malicious code. The detection management system also employs a countermeasure on the flow, which includes blocking the flow, quarantining the flow, or informing the recipient of the flow of the malicious code.

Still another aspect of the present invention pertains to a front-end system, its method, and its software. The front-end system is coupled to an external network and multiple scanning computer systems and is configured for receiving a flow of content (including a hypertext markup file or a transferred file) from the external network, duplicating the flow to produce multiple copies of the flow, and distributing a copy to each of the multiple scanning computer systems in parallel.

Yet another aspect of the present invention involves a malicious code detection cluster and its methodology that includes an internal network coupled to a front-end processor, a detection management system, and multiple scanning computer systems. The multiple scanning computer systems are configured for receiving copies of a flow of content (including, for example, email messages, their attachments and bodies, a hypertext markup file or a transferred file), executing anti-virus scanning software with different coverages to scan the copies of the flow in parallel for malicious code, and transmitting an alarm to the detection management system when the flow contains malicious code as detected by at least one of the multiple scanning computer systems.

An additional aspect of the present invention relates to a detection management system, method, and software that are used in conjunction with multiple scanning computer systems. An alarm is received from one of the multiple scanning computer systems when a flow of content (including a hypertext markup file or a transferred file) scanned by the scanning computer systems in parallel contains malicious code. A countermeasure is employed on the flow if at least one of the scanning computer systems generates an alarm on a piece of malicious code. In one embodiment, a signature of a piece of malicious code detected by at least one of the scanning computer systems in the flow is created when at least one of the scanning computer generates an alarm on the piece of malicious code. Signatures stored at a remote site detection system are then updated to include the created signature.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for malicious code detection are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Malicious Code Detection System

Figure 1:
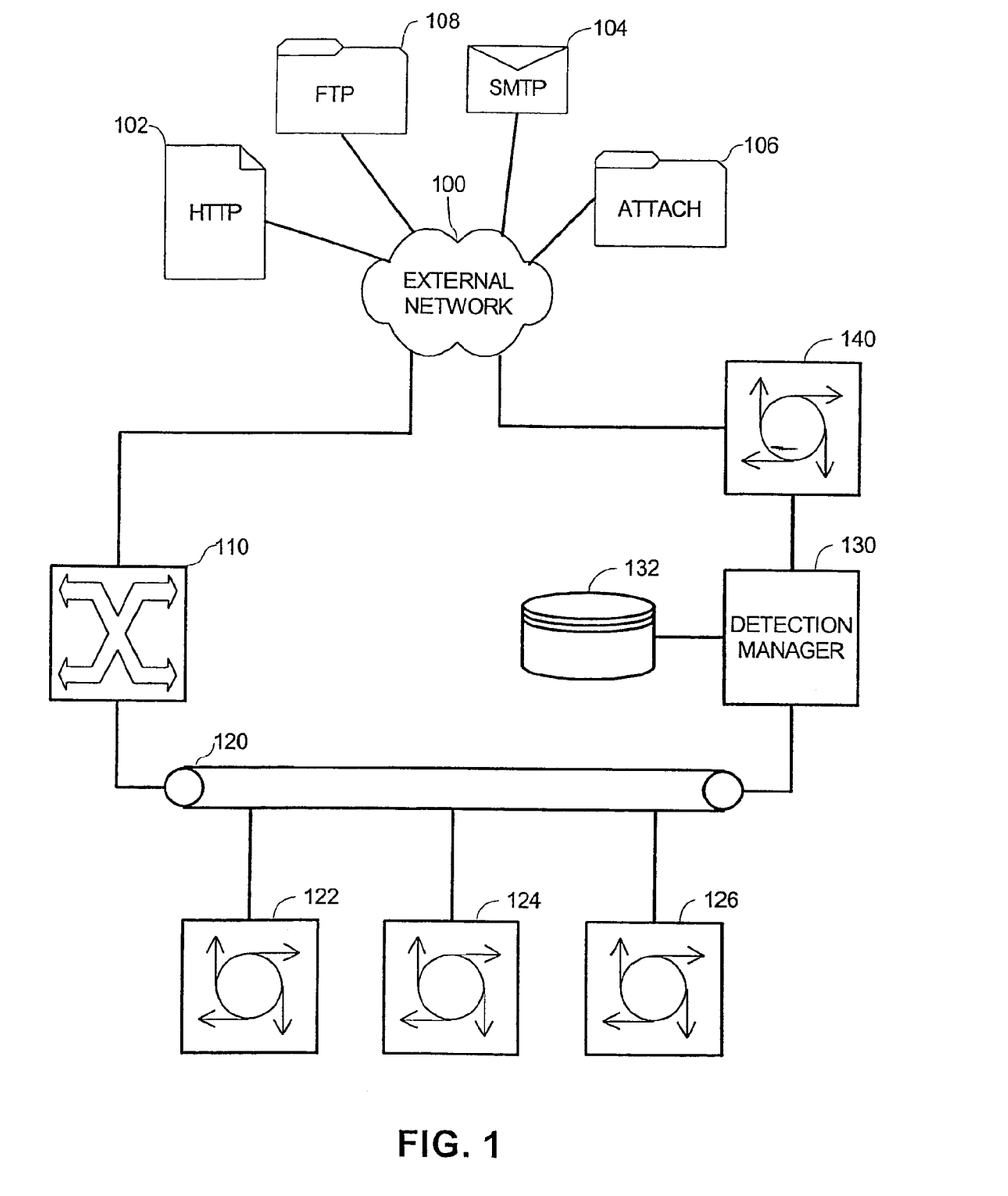
FIG. 1 is a diagram of one embodiment of a malicious code detection system in accordance with the present invention.
Figure 2:
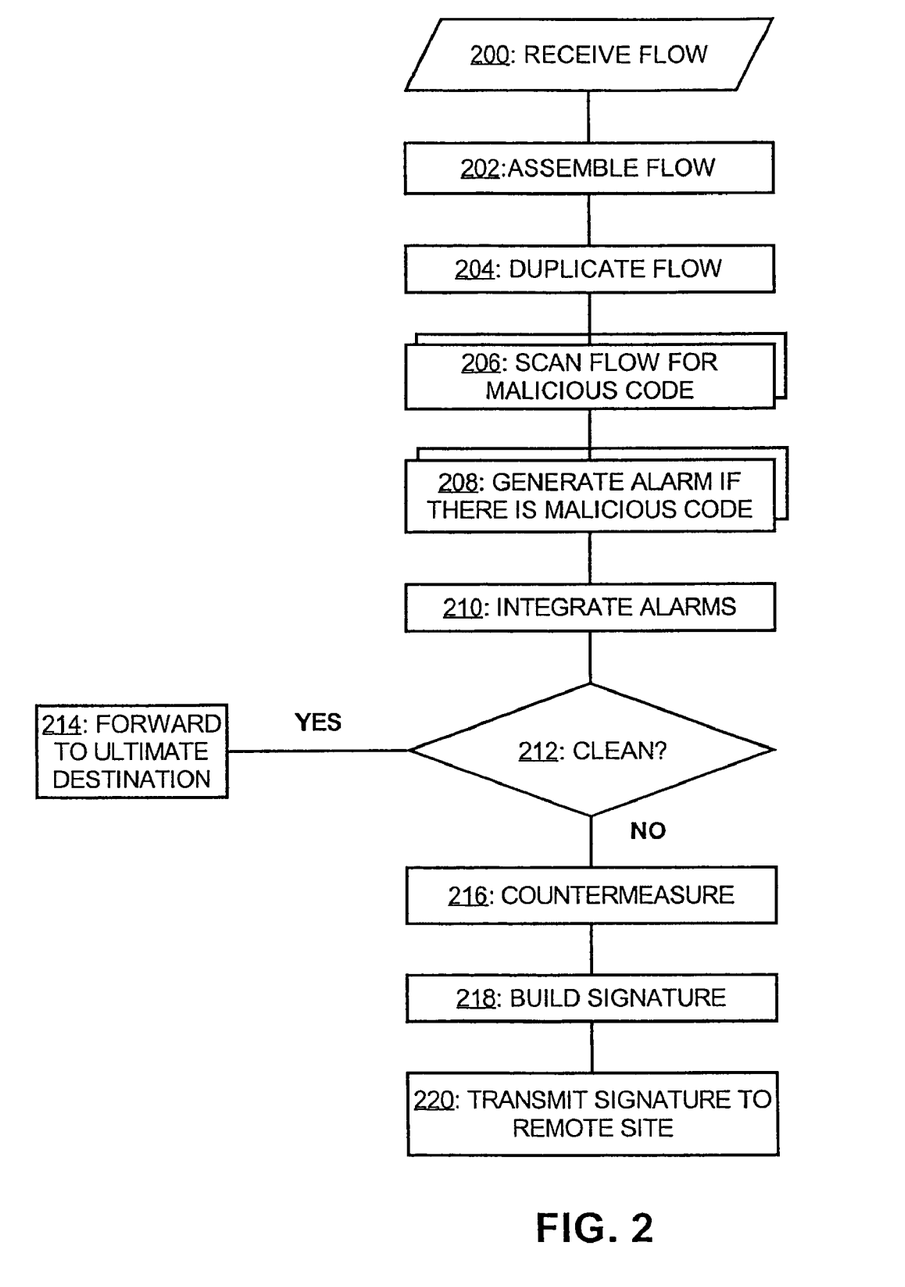
FIG. 2 is a flow chart illustrating the operation of one embodiment of a malicious code detection methodology in accordance with the present invention.

FIG. 1 depicts one embodiment of a malicious code detection system in accordance the present invention, whose operation is described in conjunction with FIG. 2. The malicious code detection system, which is suitable for deployment by Internet Service Providers (ISPs), network service providers, and corporate information systems departments for responsible for the employees' email and web browsing, is coupled to the Internet or other external network 100 for receiving content such as web pages 102, email messages 104, attachments 106 to the email messages 104, and raw files 108 transmitted over a file transfer protocol such as FTP. Since this content is received from an external network, they may contain viruses or other kinds of malicious code and therefore need to be scanned by the malicious code detection system.

Accordingly, a front-end processor 110 is coupled to the external network 100 as part of, or in conjunction with other external interface equipment (not shown), such as firewalls and load balancers. The front-end processor 110 is a computer system that is configured for receiving a "flow" of one or more of the incoming content 102, 104, 106, and 108 from the external network 110 (FIG. 2, step 200). When each flow of content is received, it is assembled into the appropriate end result (FIG. 2, step 202). For example, files received over Simple Mail Transfer Protocol (SMTP) are assembled into an email body and series of email attachment. Files received over FTP are assembled into a series of raw files, whether binary or ASCII. The HTTP traffic is assembled into a series of web pages.

The front-end processor 110 is responsible for duplicating the assembled flows for distribution to multiple scanning computer systems 122, 124, and 126 in parallel (FIG. 2, step 204). Although three multiple scanning computer systems 122, 124, and 126 are illustrated in FIG. 1, the present invention is not so limited and any number may be used. In addition, in certain implementations such as those using the CISCO CATALYST™ family switch, the front-end processor 110 may perform other functions such as load balancing. In one embodiment, the front-end processor 110 and the multiple scanning computer systems 122, 124, and 126 are coupled to a common, high-speed internal network 120, such as a fast Ethernet™ network, but in other embodiments dedicated connections may be employed between the front-end processor 110 and each of the multiple scanning computer systems 122, 124, and 126 instead.

Each of the multiple scanning computer systems 122, 124, and 126 includes a cluster of one or more processors running anti-virus software for scanning a corresponding copy of the flow for viruses and other kinds of malicious code (FIG. 2, stage 206). Different anti-virus software, obtained from different software vendors and having different coverage of known viruses, are employed to obtain an anti-viral coverage that is better than any single anti-virus software product. h high-performance implementations, extra scanning computer systems are deployed to process the flow at a higher throughput. In these implementations, the front-end processor 110 preferably performs load balancing to ensure that each of the scanning computer systems is fully utilized.

When any of the multiple scanning computer systems 122, 124, and 126 detects a virus or other kind of malicious code in the flow, the detecting scanning computer system generates an alarm, which is sent to a detection management process executing on a detection management system 130 (FIG. 2, stage 208). Preferably, the detection management system 130 is also coupled to the internal network 120 and is deployed on a separate computer system. However, other implementations are possible; for example, the detection management system 130 may be put on the same computer system as the front-end processor 110 or one of the multiple scanning computer systems 122, 124, and 126.

The detection management system 120 integrates any possible alarms received from the multiple scanning computer systems 122, 124, and 126 (FIG. 2, step 210) and checks whether an alarm was generated for a particular flow (FIG. 2, step 212). If the detection management system 130 does not receive an alarm from any of the multiple scanning computer systems 122, 124, and 126 for a particular flow, then the flow is directed to its ultimate destination, for example, to a user computer connected to an ISP or to a corporate intranet (FIG. 2, step 214).

On the other hand, if the detection management system 130 does receive an alarm from any of the multiple scanning computer systems 122, 124, and 126 for a particular flow, then an appropriate countermeasure is executed on the flow (FIG. 2, step 216). Various countermeasures may be employed and include any one or more of the following: destroying the flow, quarantining the flow in a safe directory for a period of time such as thirty days for possible study, and emailing a separate message or embedding a message to the recipient and/or sender informing the person that the email message contained a virus. For an HTTP web page, an appropriate message may be embedded into the web page, e.g. by appropriate HTML or other markup or by Javascript™ or other scripting language instructions, informing the surfer of the virus in the web page.

Because multiple scanning computer systems 122, 124, and 126 inspect the flows for malicious code in parallel, the latency of the system is limited to the latency of the slowest one of the multiple scanning computer systems 122, 124, and 126 plus some overhead for duplicating and distributing the flow and integrating the alarms. Consequently, the total latency is commensurate with that of one anti-virus scanner, not the sum total of all the different anti-virus scanners as in prior approaches, while the anti-viral coverage is a superset of the anti-virus scanners. This solution is particularly advantageous for people using a browser to access the World Wide Web to view web pages or transfer files that may contain viruses. The latency is at an acceptable half second, instead of the unacceptably slow 1.2 seconds of the serial anti-virus scan approach.

Dynamic Allocations to Remote Sites

Some customers may wish to take advantage of the improved coverage of multiple anti-virus scanners but cannot afford the hardware and software costs associated with the full solution. Accordingly, one aspect of the present invention involves a mechanism for integrating the broad coverage obtained from the multiple anti-virus scanner solution for use by remote sites that can only afford one anti-virus scanner.

In an embodiment of this aspect, as illustrated in FIG. 1, the detection manager system 130 is also coupled to a relational or other kind of database 132. The database 132 stores rules for creating signatures of detected viruses. Thus, as viruses are detected by the detection manager system 130 in response to alarms generated by the multiple scanning computer systems 122, 124, and 126, the detection manager system 130 creates a signature that identifies the virus or other kind of malicious code, such as a Trojan horse, worm, etc. (FIG. 2, step 218).

Periodically, or upon detection of a new virus, the detection manager system 130 transmits the new signatures to the remote site scanning system 140 to augment the catalog of signatures stored at the remote site scanning system 140 (FIG. 2, step 220). As a result, the remote site scanning system 140 is updated to include the signatures of the latest viruses.

Coverage of live viruses that were detected by the detection manager system 130 is particularly beneficial and cost effective for a small remote site scanning system 140. Although the native anti-virus scanner at a small remote site scanning system 140 is not as broad at the aggregate coverage of the multiple scanning computer systems 122, 124, and 126, the volume of the traffic through the small remote site scanning system 140 is typically much smaller than the volume of the traffic through the high-performance front-end processor 110. Consequently, a virus during an outbreak is more likely to be transmitted through the higher-volume front-end processor 110 before reaching the lower-volume small remote site scanning system 140. In this common situation, the system comprising the front-end processor 110, the multiple scanning computer systems 122, 124, and 126, and the detection manager system 130 are able to preemptively identify a virus and add its signature to the small remote site scanning system 140, well before the virus is actually transmitted to the small remote site scanning system 140. Thus, the small remote site scanning system 140 is able to take advantage of the broader anti-virus scanning coverage of the multiple scanning computer systems 122, 124, and 126 without the comparable investment in hardware resources.

Hardware Overview

Figure 3:
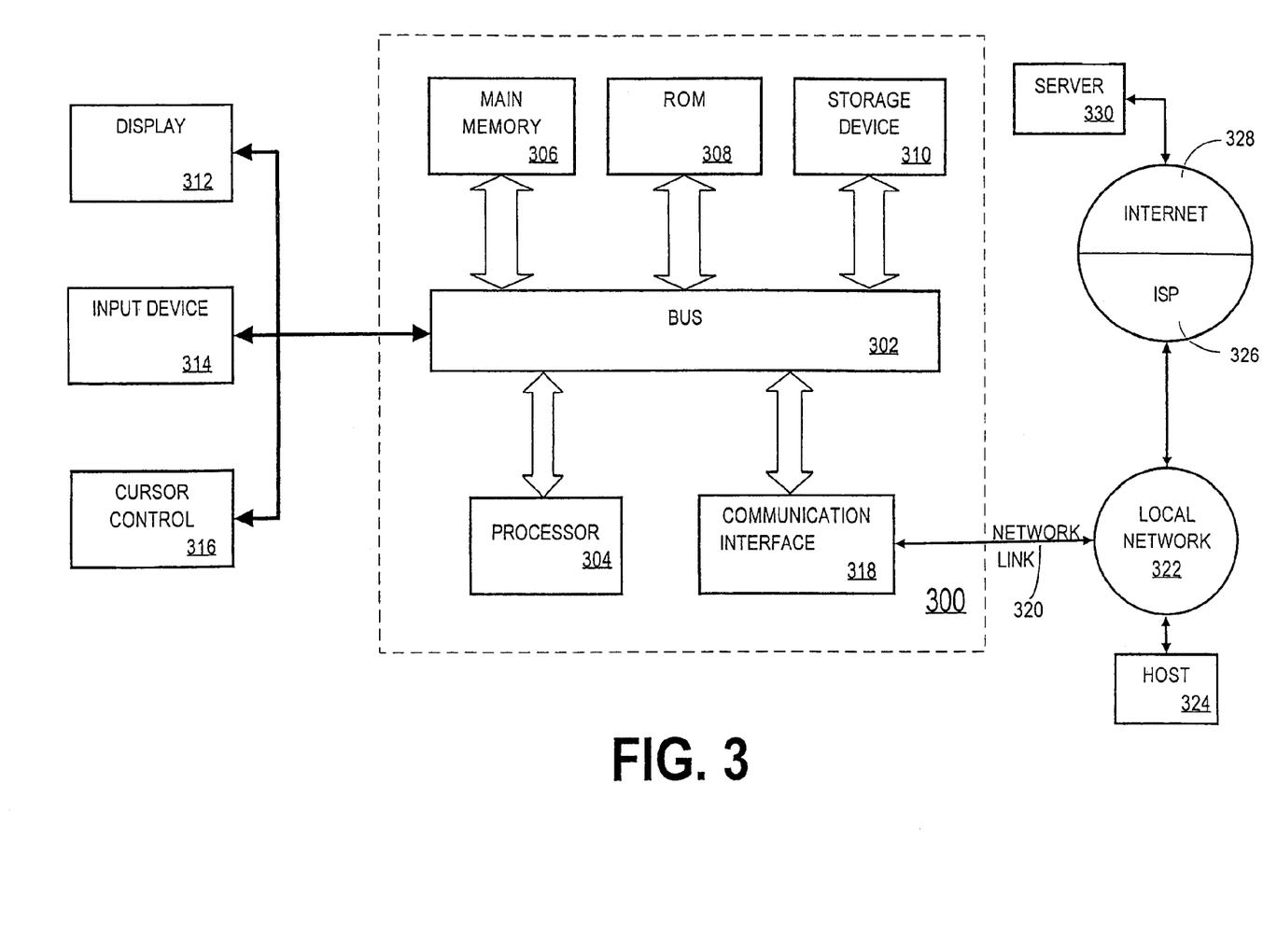
FIG. 3 depicts a computer system that can be used to implement various aspects of an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for aspects of malicious code detection. According to one embodiment of the invention, various aspects of malicious code detection are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media include, for example, optical or magnetic disks, such as storage device 310. Volatile media include dynamic memory, such as main memory 306. Transmission media include coaxial cables, copper wire and fiber optics, including the wires that comprise bus 302. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network, now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320, and communication interface 318. In the Internet example, a server 330 might transmit a requested code for an application program through Internet 328, ISP 326, local network 322 and communication interface 318. In accordance with the invention, one such downloaded application provides for malicious code detection as described herein. The code may be executed by processor 304 as it is received, and/or stored in storage device 310, or other non-volatile storage for later execution. In this manner, computer system 300 may obtain application code in the form of a carrier wave.

Accordingly, a system, methodology, and software for detection of malicious code is described, in which content from an external network is scanned by software multiple scanning computer systems in parallel. Latency is reduced from the sum of the delays introduced by all the malicious code scanners to be commensurate with the delay of one of the malicious code scanner, without comprising coverage. Furthermore, the benefits of the increased coverage can be transmitted to remote site scanning systems, without the need for additional hardware costs.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A system for malicious code detection, comprising:
   a plurality of scanning computer systems configured for scanning content for malicious code and generating an alarm when the content contains malicious code; and
   a front-end processor, coupled to the plurality of scanning computer systems, configured for receiving a flow of content from an external network and distributing a common copy of the flow to each of the plurality of scanning computer systems in parallel for scanning; and
   a detection management system, coupled to the plurality of scanning computer systems, configured for employing a countermeasure on the flow if at least one of the plurality of scanning computer systems generates the alarm.

2. The system according to claim 1, further comprising a database containing rules configured for creating a signature of a piece of malicious code detected by at least one of the plurality of scanning computer systems.

3. The system according to claim 2, further comprising a remote site detection system configured for detecting malicious code in incoming network traffic based on signatures of malicious code stored thereat.

4. The system according to claim 3, wherein the detection management system is further configured for causing the signatures stored at the remote site detection system to be updated to include the signature of the piece of malicious code detected by said at least one of the plurality of scanning computer systems.

5. The system according to claim 1, wherein each of the plurality of scanning computer systems is configured to execute respective anti-virus scanning software having different, corresponding coverage of malicious code.

6. The system according to claim 1, wherein the flow includes at least one of a hypertext markup file and a transferred file.

7. The system according to claim 1, wherein the countermeasure includes at least one of blocking the flow, quarantining the flow, and informing the recipient of the flow of the malicious code.

8. The system according to claim 1, wherein each one of the plurality of scanning computer systems is configured to execute malicious code detection software other than detection software executed by any other one of the plurality of scanning computer systems.

9. A system for malicious code detection, comprising: a remote site detection system configured for detecting malicious code in incoming network traffic based on signatures of malicious code stored thereat;
   a plurality of scanning computer systems configured to execute respective anti-virus scanning software having different, corresponding coverage of malicious code for scanning content for malicious code and generating an alarm when the content contains malicious code; and
   a front-end processor, coupled to the plurality of scanning computer systems, configured for receiving a flow of content from an external network and distributing a common copy of the flow to each of the plurality of scanning computer systems in parallel for scanning, said flow including at least one of a hypertext markup file and a transferred file; and
   a detection management system, coupled to the plurality of scanning computer systems, configured creating a signature of a piece of malicious code detected by at least one of the plurality of scanning computer systems detected in the flow when at least one of the plurality of scanning computer systems generates an alarm on the piece of malicious code;
   employing a countermeasure on the flow if at least one of the plurality of scanning computer systems generates an alarm on the piece of malicious code, said countermeasure including at least one of blocking the flow, quarantining the flow, and informing the recipient of the flow of the malicious code; and
   causing the signatures stored at the remote site detection system to be updated to include the signature of the piece of malicious code detected by said at least one of the plurality of scanning computer systems.

10. A method for malicious code detection in a system including a plurality of scanning computer systems, comprising:
    receiving a flow of content from an external network;
    distributing a common copy of the flow to each of the plurality of scanning computer systems in parallel;
    scanning the flow for malicious code and generating an alarm when the content contains malicious code at each of the plurality of scanning computer systems; and
    employing a countermeasure on the flow if at least one of the plurality of scanning computer systems generates the alarm.

11. The method according to claim 10, further comprising creating a signature of a piece of malicious code detected by at least one of the plurality of scanning computer systems.

12. The method according to claim 11, further comprising detecting malicious code in incoming network traffic at a remote site detection system based on signatures of malicious code stored thereat.

13. The method according to claim 12, further comprising updating the signatures stored at the remote site detection system to include the signature of the piece of malicious code detected by said at least one of the plurality of scanning computer systems.

14. The method according to claim 10, wherein said scanning at each of the plurality of scanning computer systems includes executing respective anti-virus scanning software having different, corresponding coverage of malicious code.

15. The method according to claim 10, wherein the flow includes at least one of a hypertext markup file and a transferred file.

16. The method according to claim 10, wherein said employing the countermeasure includes at least one of blocking the flow, quarantining the flow, and informing the recipient of the flow of the malicious code.

17. The method according to claim 10, wherein said scanning at each of the plurality of scanning computer systems includes executing malicious code detection software other than detection software executed by any other one of the plurality of scanning computer systems.

18. A method for malicious code detection in a system including a remote site detection system and a plurality of scanning computer systems, comprising:
- receiving a flow of content from an external network, said flow including at least one of a hypertext markup file and a transferred file;
- distributing a common copy of the flow to each of the plurality of scanning computer systems in parallel;
- at each of the plurality of scanning computer systems, executing respective anti-virus scanning software having different, corresponding coverage of malicious code to scan the flow for malicious code scanning and generating an alarm when the flow contains malicious code;
- creating a signature of a piece of malicious code detected by at least one of the plurality of scanning computer systems detected in the flow when at least one of the plurality of scanning computer systems generates an alarm on the piece of malicious code;
- causing signatures stored at the remote site detection system to be updated to include the signature of the piece of malicious code detected by said at least one of the plurality of scanning computer systems;
- employing a countermeasure on the flow if at least one of the plurality of scanning computer systems generates an alarm on the piece of malicious code, including at least one of blocking the flow, quarantining the flow, and informing the recipient of the flow of the malicious code; and
- detecting malicious code in incoming network traffic based on the signatures of malicious code stored thereat.

19. A front-end system, coupled to an external network and a plurality of scanning computer systems, said front-end system comprising one or more processors, a communications interface, and a computer-readable medium bearing instructions for causing the one or more processors upon execution thereof to perform the steps of:
- receiving a flow of content from the external network, said flow including at least one of a hypertext markup file and a transferred file;
- duplicating the flow to produce a plurality of common copies of the flow; and distributing the common copies of the flow to each of the plurality of scanning computer systems in parallel, for scanning content for malicious code detection and alarm generation.

20. A method for operating a front-end system, coupled to an external network and a plurality of scanning computer systems, said method comprising:
- receiving a flow of content from the external network, said flow including at least one of a hypertext markup file and a transferred file;
- duplicating the flow to produce a plurality of common copies of the flow; and distributing the common copies of the flow to each of the plurality of scanning computer systems in parallel, for scanning content for malicious code detection and alarm generation.

21. A computer-readable medium bearing instructions for operating a front-end system, coupled to an external network and a plurality of scanning computer systems, said instructions arranged, when executed, for causing one or more processors to perform the steps of:
- receiving a flow of content from the external network, said flow including at least one of a hypertext markup file and a transferred file;
- duplicating the flow to produce a plurality of common copies of the flow; and
- distributing the common copies of the flow to each of the plurality of scanning computer systems in parallel, for scanning content for malicious code detection and alarm generation.

22. A malicious code detection cluster, comprising:
- an internal network coupled to a front-end processor and a detection management system;
- a plurality of scanning computer systems coupled to the internal network and configured for:
- receiving respective common copies of a flow of content from the front-end processor in parallel, said flow including at least one of a hypertext markup file and a transferred file;
- executing respective anti-virus scanning software having different, corresponding coverage of malicious code to scan the respective common copies of the flow in parallel for malicious code; and
- transmitting an alarm to the detection management system when the flow contains malicious code as detected by at least one of the anti-virus scanning software.

23. A method of detecting malicious code in an internal network coupled to a front-end processor, a plurality of scanning computer systems, and a detection management system, said method comprising the steps of:
- receiving respective common copies of a flow of content from the front-end processor in parallel, said flow including at least one of a hypertext markup file and a transferred file;
- executing respective anti-virus scanning software having different, corresponding coverage of malicious code to scan the respective common copies of the flow in parallel for malicious code; and
- transmitting an alarm to the detection management system when the flow contains malicious code as detected by at least one of the anti-virus scanning software.

24. A detection management system, coupled to a plurality of scanning computer systems, said detection management system comprising one or more processors, a communications interface, and a computer-readable medium bearing instructions arranged for causing the one or more processors upon execution thereof to perform the steps of:
- receiving an alarm from one of the plurality of scanning computer systems when a common flow of content scanned by the plurality of scanning computer systems in parallel contains malicious code, said common flow including at least one of a hypertext markup file and a transferred file; and
- employing a countermeasure on the common flow if at least one of the plurality of scanning computer systems generates an alarm on a piece of the malicious code.

25. The detection management system according to claim 24, wherein the countermeasure includes at least one of blocking the common flow, quarantining the common flow, and informing the recipient of the common flow of the malicious code.

26. The detection management system according to claim 24, wherein the detection management system is further coupled to a remote site detection system and said instructions are further arranged for causing the one or more processors to perform the steps of:
- creating a signature of a piece of malicious code detected by at least one of the plurality of scanning computer systems in the flow when at least one of the plurality of scanning computer systems generates an alarm on the piece of malicious code; and
- causing signatures stored at the remote site detection system to be updated to include the signature of the piece of malicious code detected by said at least one of the plurality of scanning computer systems.

27. A method of managing malicious code detection, comprising:
- receiving an alarm from one of a plurality of scanning computer systems when a common flow of content scanned by the plurality of scanning computer systems in parallel contains malicious code, said common flow including at least one of a hypertext markup file and a transferred file; and
- employing a countermeasure on the common flow if at least one of the plurality of scanning computer systems generates an alarm on a piece of the malicious code.

28. The method according to claim 27, wherein said employing the countermeasure includes at least one of blocking the common flow, quarantining the common flow, and informing the recipient of the common flow of the malicious code.

29. The method according to claim 27, further comprising:
- creating a signature of a piece of malicious code detected by at least one of the plurality of scanning computer systems in the common flow when at least one of the plurality of scanning computer systems generates an alarm on the piece of malicious code; and
- causing signatures stored at a remote site detection system to be updated to include the signature of the piece of malicious code detected by said at least one of the plurality of scanning computer systems.

30. A computer-readable medium bearing instructions for managing malicious code detection, said instructions arranged for causing the one or more processors upon execution thereof to perform the steps of:
- receiving an alarm from one of a plurality of scanning computer systems when a common flow of content scanned by the plurality of scanning computer systems in parallel contains malicious code, said common flow including at least one of a hypertext markup file and a transferred file; and
- employing a countermeasure on the common flow if at least one of the plurality of scanning computer systems generates an alarm on a piece of the malicious code.

31. The computer-readable medium according to claim 30, wherein the countermeasure includes at least one of blocking the common flow, quarantining the common flow, and informing the recipient of the common flow of the malicious code.

32. The computer-readable medium according to claim 30, wherein said instructions are further arranged for causing the one or more processors to perform the steps of:
- creating a signature of a piece of malicious code detected by at least one of the plurality of scanning computer systems in the common flow when at least one of the plurality of scanning computer systems generates an alarm on the piece of malicious code; and
- causing signatures stored at a remote site detection system to be updated to include the signature of the piece of malicious code detected by said at least one of the plurality of scanning computer systems.

* * * * *